(12) United States Patent
Billstrand et al.

(10) Patent No.: US 12,322,940 B2
(45) Date of Patent: Jun. 3, 2025

(54) BRAID FLARE TOOL

(71) Applicant: TE Connectivity Solutions GmbH, Schaffhausen (CH)

(72) Inventors: Kristin Billstrand, Middletown, PA (US); Marissa Jayne Feinman, Middletown, PA (US); Thomas Emery Backenstoes, Middletown, PA (US); Christopher John Gavlak, Middletown, PA (US); Matthew Steven Houser, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 346 days.

(21) Appl. No.: 17/943,441

(22) Filed: Sep. 13, 2022

(65) Prior Publication Data
US 2024/0088635 A1  Mar. 14, 2024

(51) Int. Cl.
*H02G 1/12* (2006.01)

(52) U.S. Cl.
CPC .................................... *H02G 1/12* (2013.01)

(58) Field of Classification Search
CPC ...... H02G 1/12; H02G 1/1265; H02G 1/1297; B25B 9/02; B25B 33/00
See application file for complete search history.

(56) References Cited

U.S. PATENT DOCUMENTS

| | | | |
|---|---|---|---|
| 1,594,792 A | | 8/1926 | Mortimer |
| 3,906,957 A | * | 9/1975 | Weston ...................... B25B 9/02 606/174 |
| 5,044,058 A | * | 9/1991 | Voss ......................... H01K 3/32 294/99.2 |
| 5,192,106 A | * | 3/1993 | Kaufman ............... G11B 23/00 294/93 |
| 6,536,103 B1 | * | 3/2003 | Holland .................. H01R 43/28 81/9.41 |
| 8,262,144 B2 | * | 9/2012 | Lee ........................... B25B 9/02 294/99.2 |
| 10,840,680 B2 | * | 11/2020 | Houser ................. H02G 1/1297 |
| 2004/0031144 A1 | | 2/2004 | Holland |
| 2007/0130775 A1 | * | 6/2007 | Holbrook .................. B25B 7/22 30/120.4 |

FOREIGN PATENT DOCUMENTS

| | | |
|---|---|---|
| EP | 1972394 B1 | 9/2008 |
| GB | 119313 A | 10/1918 |

OTHER PUBLICATIONS

European Search Report, European App. No EP 23197154 International Filing Date Sep. 13, 2023.

\* cited by examiner

*Primary Examiner* — David B. Thomas

(57) ABSTRACT

A tool has a first gripping portion or arm and a second gripping portion or arm hingedly connected to the first gripping portion. The first and second gripping portions define a cable space therebetween sized to receive a cable. A first lever arm and a second lever arm extend from the first gripping portion and the second gripping portion, respectively. A flexure is arranged between the first lever arm and the second lever arm and biases the first and second lever arms into a predetermined position.

20 Claims, 3 Drawing Sheets

BRAID FLARE TOOL

FIELD OF THE INVENTION

The present disclosure relates to the field of cable preparation, and more specifically, to a tool for flaring or opening an end of a braided shielding layer of an electrical cable.

BACKGROUND

When preparing a shielded cable for connectorization, it is often necessary to flare or open the end of one or more layers of the cable, such as a braided shielding layer, in order to accommodate a connector. Prior art solutions for performing these flaring operations include manual tools. According to one embodiment, a prior art tool comprises a multi-component assembly including two housing portions rotatably connected together and biased into the closed position by a torsion spring. Rotating wheels attached to the housing portions operate to flare the shield under compressive force applied by the spring. While effective, these tools are overly complex, and therefore expensive to manufacture.

Improved solutions for manually flaring or opening one or more layers of a cable are desired.

SUMMARY

According to an embodiment of the present disclosure, a cable braid flare tool has a first gripping portion or arm and a second gripping portion or arm hingedly connected to the first gripping portion. The first and second gripping portions define a cable space therebetween sized to receive a cable. A first lever arm and a second lever arm extend from the first gripping portion and the second gripping portion, respectively. A flexure is arranged between the first lever arm and the second lever arm and biases the first and second lever arms into a predetermined position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
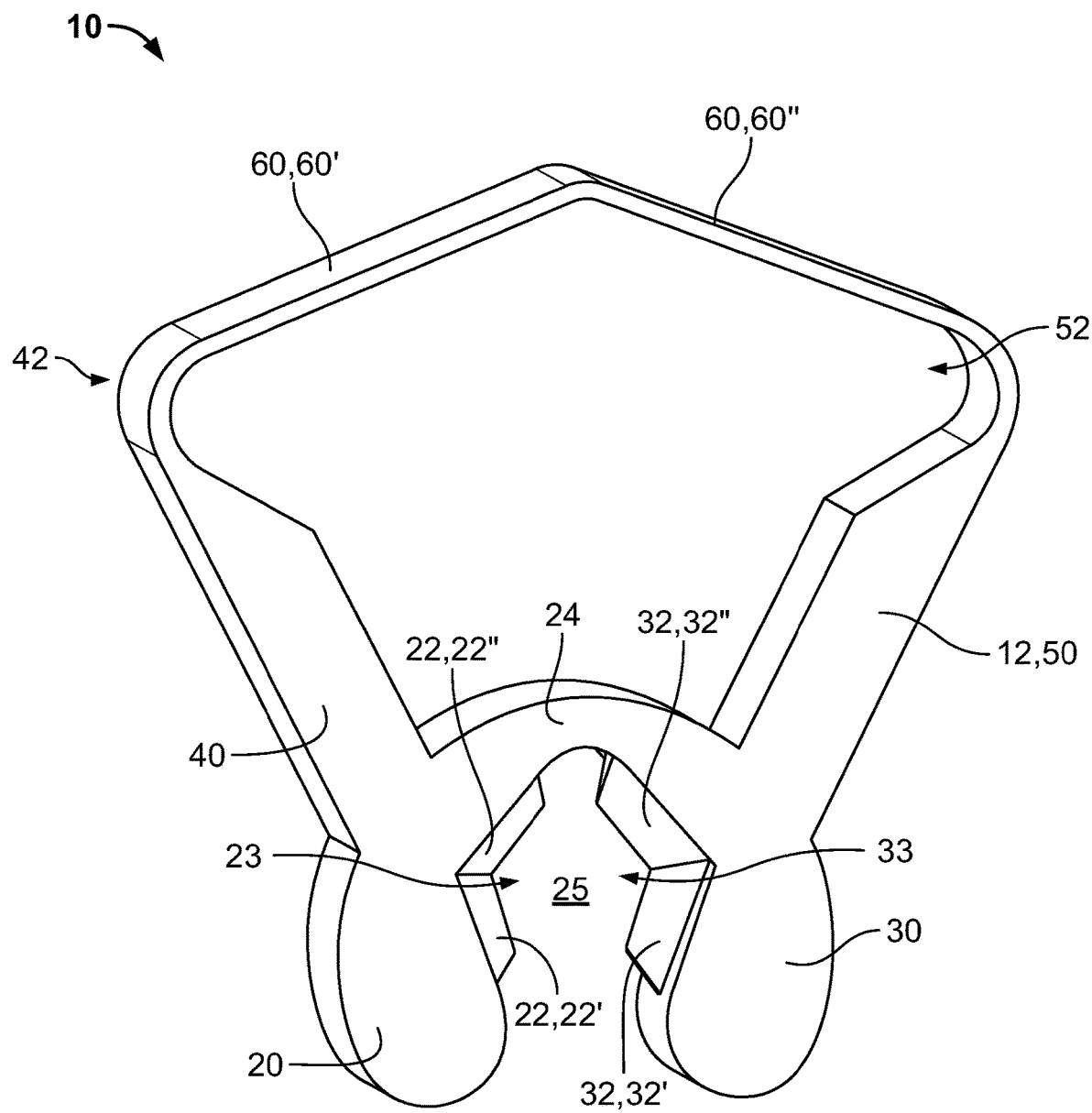
FIG. 1 is a front perspective view of a braid flare tool according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring generally to FIG. 1, a braid flaring tool 10 according to an embodiment of the present disclosure includes a body 12. In one embodiment, the body 12 comprises a generally flexible, monolithic structure. The body 12 may be formed (e.g., molded) from a polymer material, by way of example. In one embodiment, the body 12 may be symmetrical both side to side as well as front to back (i.e., about at least two orthogonal/vertical planes relative to the orientation shown).

The body 12 defines a first gripping portion or arm 20 and a second gripping portion or arm 30. The gripping arms 20,30 are also referred to herein as clamping arms or clamping jaws. The gripping arms 20,30 define interior surfaces or faces which oppose one another and define a cable space 25 therebetween. In the exemplary embodiment, the gripping arms 20,30 are hingedly or pivotally connected to one another via an integral living hinge 24. The hinge 24 enables the gripping arms 20,30 to be biased both toward one another, as well as away from one another via the selective application of force on the tool 10. As shown, the hinge 24 is defined by a thinned or narrowed portion of the body 12 arranged between the gripping arms 20,30. Specifically, a thickness of the living hinge 24 in a radial direction relative to a bending axis of the hinge is less than the thickness of a remainder of the gripping arms 20,30. In this way, the application of force on either of the gripping arms 20,30 is operative to bend or rotate the gripping arms about the bending axis of the hinge 24 for altering the size of the cable space 25.

The body 12 further defines a first lever arm 40 and a second lever arm 50. In one embodiment, the lever arms 40,50 extend linearly from a respective one of the first and second gripping arms 20,30. Each lever arm 40,50 is arranged on a side of the hinge 24 opposite its associated gripping arm 20,30. As a result, biasing one or more of the lever arms 40,50 in either bending direction of the hinge 24 results in the opposite direction of motion of the associated gripping arm 20,30. For example, biasing the lever arms 40,50 in a direction toward one another is operative to open the gripping arms 20,30, increasing the diameter or size of the cable space 25 for accepting a cable. As shown, the lever arms 40,50 are oriented obliquely relative to one another in an undeformed or resting state of the tool 10.

As set forth above, the cable space 25 is defined between interior faces of the gripping arms 20,30. More specifically, the first and second gripping arms 20,30 further include respective protruding edges 22,32 formed on interior surfaces thereof. The protruding edges 22,32 extend toward one another to define the cable space 25. In the exemplary embodiment, each protruding edge 22,32 comprises first and second linear edge segments 22',22",32',32'. Each pair of edge segments 22',22" and 32',32" are continuous with one another for defining an uninterrupted edge. The respective edge segments 22',22",32',32" are oriented obliquely relative to each other. In this way, each protruding edge 22,32 defines a concave, wedge-shaped cutout 23,33. As the cutouts 23,33 converge via biasing of the gripping arms 20,30 inward, the cable space 25 takes the form of a rhombus or a diamond-shaped opening.

The protruding edges 22,32 are tapered in cross-section (e.g., triangular), with a widened base defined directly adjacent the gripping arms 20,30. The base of each edge 22,32 tapers to an apex or free edge approaching the cable space 25. The free edge of each protruding edge 22,32 is operative to engage with an exterior side of a layer of a cable for performing a flaring operation. In one embodiment, the protruding edges 22,32 may be monolithically formed with a remainder of the body 12. In other embodiments, inserts (i.e., metallic inserts) may be embedded within the body 12, and more specifically within the protruding edges 22,32, for stiffening and/or strengthening the edges. Similar inserts may be present between the gripping arms 20,30 and their respective lever arms 40,50.

Still referring to FIG. 1, a connecting element or flexure 60 is formed between free ends of the lever arms 40,50. The exemplary connecting element 60 is non-linear along its length between the lever arms 40,50 in the undeformed or resting state of the tool 10. In the exemplary embodiment, the connecting element 60 comprise two linear segments 60',60" oriented obliquely with respect to one another in the undeformed state of the tool 10. In other embodiments, the connecting element 60 may be curved in the undeformed state. In this way, the connecting element 60 permits the gripping arms 20,30 to be biased further toward one another. More specifically, as the gripping arms 20,30 converge under an external force, the connecting element 60 straightens, increasing its resistance to further closure of the gripping arms 20,30. Thus, the connecting element 60 may be used to limit or set the minimum size of the cable space 25. In one embodiment, the connecting element 60 is elastic or flexible in nature, and along with the hinge 24, biases the lever arms 40,50 toward their illustrated positions in the undeformed state of the tool 10.

At least one of the connecting element 60 or the first and second lever arms 40,50 define opposing recesses 42,52 therein. More specifically, the recesses 42,52 are formed into an interior surface of each lever arm 40,50 and/or the connecting element 60. The recesses 42,52 are sized to accommodate a finger of a user of the tool 10, by way of example. During the performance of a flaring operation, the tool 10 may be rotated by a user by placing at least one finger within at least one of the recesses 42,52. The recesses 42,52 and the connecting element 60 arranged immediately adjacent thereto prevent the finger(s) of the user from slipping off of the tool 10 as it is rotated. This increases the accuracy, speed and efficiency with which a user may operate the tool 10.

Figure 2:
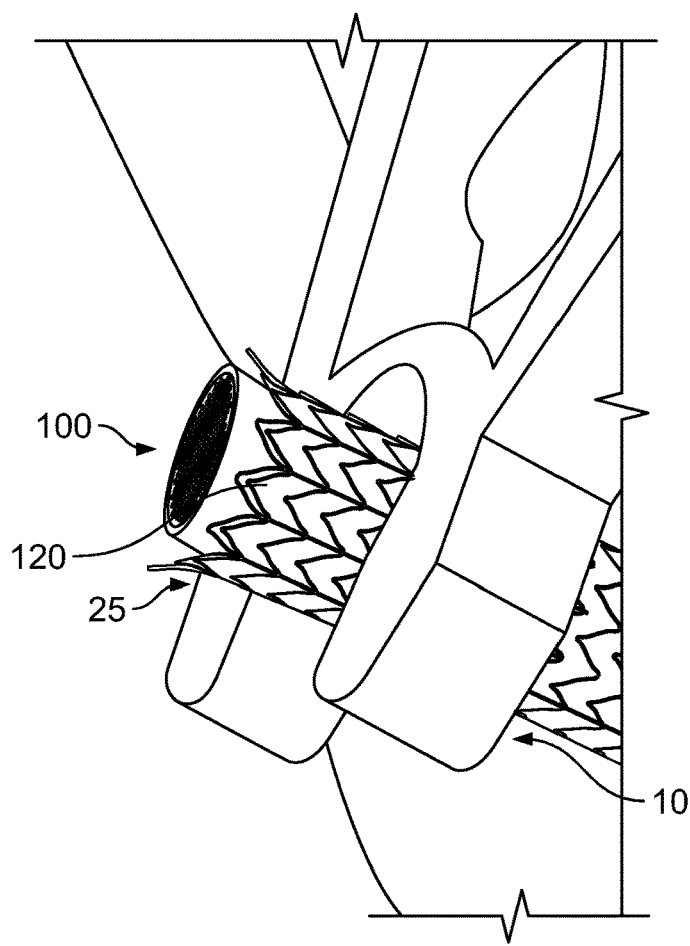
FIG. 2 is a perspective view of the braid flare tool of FIG. 1 arranged over a partially stripped cable.

Referring now to FIG. 2, the tool 10 according to an embodiment of the present disclosure is shown arranged over an exemplary cable 100. The cable 100 includes an outer insulating layer 110 (see FIGS. 4 and 5), which has been at least partially removed from the cable, as shown in FIG. 1. Removal of the insulation 110 reveals a braid shield or shielding layer 120. In order to open or flair an end of braid shield 120, the cable 100 is received within the cable space 25 of the tool 10 such that the protruding edges 22,32 (see FIG. 3) abut the braid shield proximate a free end of the cable. In the exemplary embodiment, a diameter of the braid shield 120 is greater than a corresponding dimension of the cable space 25 with the tool 10 in the resting state. In this way, an elastic return force generated by the living hinge 24 and/or the connecting element 60 is operative to apply a compressive force on the cable 100, absent a user having to manually compress the gripping arms 20,30 either directly or via the lever arms 40,50.

Figure 3:
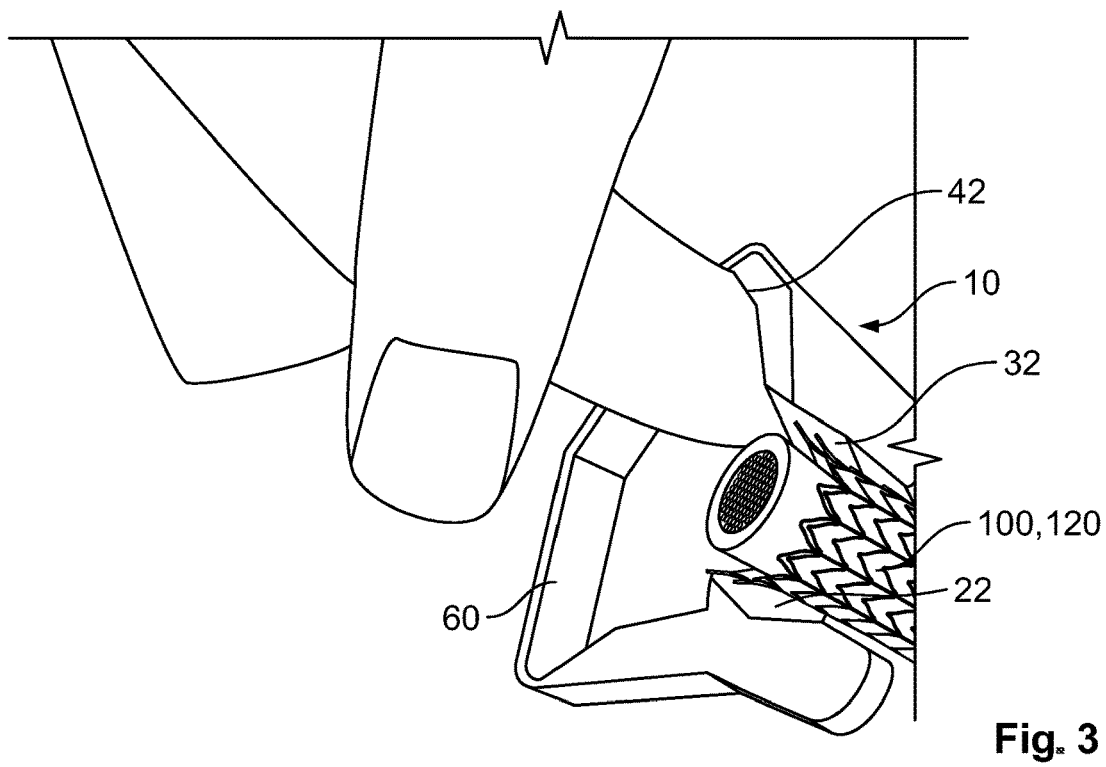
FIG. 3 is a perspective view illustrating the operation of the braid flare tool of FIG. 1.
Figure 4:
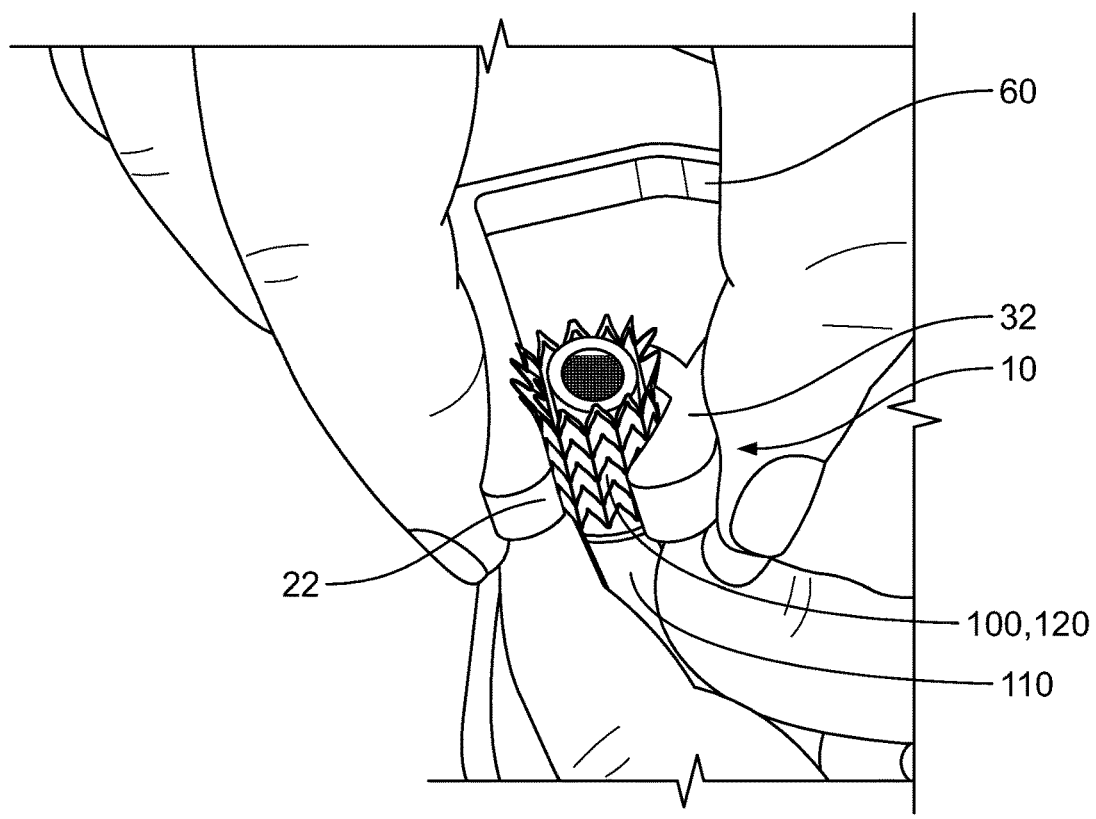
FIG. 4 is another perspective view illustrating the operation of the braid flare tool of FIG. 1.
Figure 5:
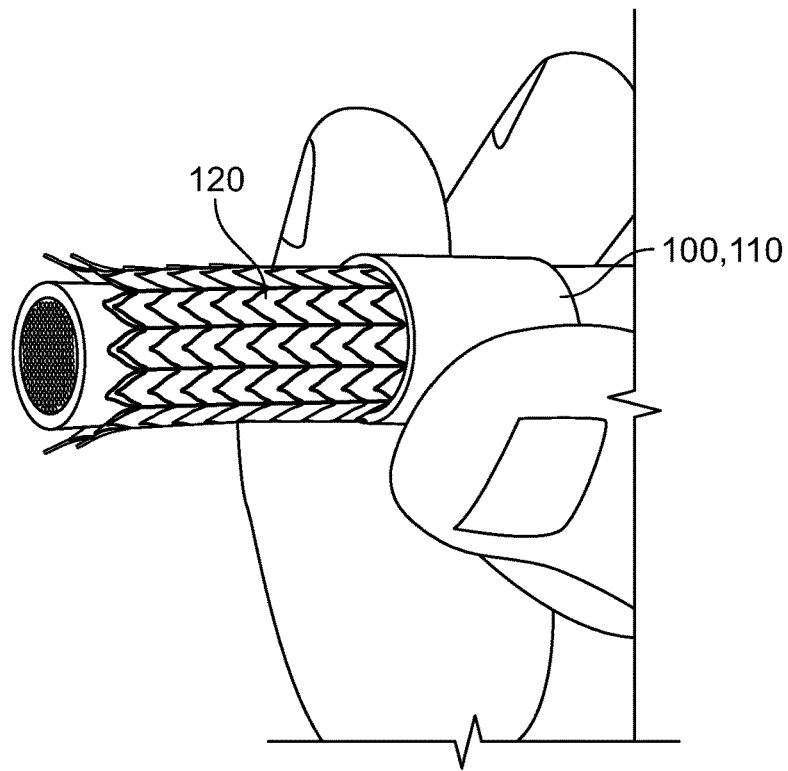
FIG. 5 is a perspective view of the cable of FIGS. 2-4 after a braided shielding layer of the cable has been flared.

As shown in FIG. 3, flaring of the braid shield 120 may be achieved via rotating the tool 10 about the cable 100. As set forth above, this may be achieved by a user inserting a finger into one of the recesses 42,52, and applying a lateral force on the tool 10 causing its rotation about the cable 100. The protruding edges 22,32 deform the braid shield 120 inward in an area of contact. This results in the radially-outward deflection of free ends of the braided wires of the braid shield 120. Referring to FIG. 4, in another method of use, a user may manually compress the gripping arms 20,30 toward one another in order to generate additional compressive force on the braid shield 120 via the protruding edges 22,32. This method results in additional flaring. As shown in FIG. 5, as the tool 10 is rotated by a user, the braid shield 120 is flared in a generally uniform manner about its circumference. With the braid shield 120 flared on its end, a connectorization process may continue.

It should be understood that embodiments of the present disclosure provide a simplified, reliable tool for performing braid shield flaring operations. As the tool according to embodiments of the present disclosure comprises no moving parts, and may be implemented with a single-piece construction, reliability is improved and production costs are lower compared to arrangements of the prior art.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A flaring tool, comprising:
    a first gripping arm and a second gripping arm hingedly connected to the first gripping arm, the first and second gripping arms each defining a flaring edge;
    a cable space defined between the flaring edges and sized to receive a cable to be flared;
    a first lever arm and a second lever arm extending from the first gripping arm and the second gripping arm, respectively; and
    a connecting element arranged between the first lever arm and the second lever arm, the connecting element biasing the first and second lever arms away from one another, wherein the first and second gripping arms, the first and second lever arms and the connecting element are formed integrally with one another.

2. The flaring tool according to claim 1, wherein the flaring edges include a first protruding edge extending from the interior of the first gripping arm in a direction of the second gripping arm, and a second protruding edge extending from the interior of the second gripping arm in a direction of the first gripping arm.

3. The flaring tool according to claim 2, wherein the first protruding edge comprises a tapered protrusion.

4. The flaring tool according to claim 3, wherein the first protruding edge is formed by first and second adjacent and continuous linear sections, the second linear section oriented obliquely relative to the first linear section.

5. The flaring tool according to claim 4, wherein the second protruding edge is formed by third and fourth adjacent and continuous linear sections, the fourth linear section oriented obliquely relative to the third linear section.

6. The flaring tool according to claim 5, wherein the first and second protruding edges define a cable space having a diamond shaped cross-section.

7. The flaring tool according to claim 1, wherein the first and second gripping arms are connected by a living hinge.

8. The flaring tool according to claim 7, wherein the first and second lever arms are arranged on opposite sides of the living hinge from the first and second gripping portions, respectively.

9. The flaring tool according to claim 1, wherein in an undeformed state of the tool, the first and second lever arms are oriented obliquely relative to one another.

10. The flaring tool according to claim 1, wherein in an undeformed state of the tool, the connecting element extends non-linearly between the first lever arm and the second lever arm.

11. The flaring tool according to claim 1, wherein the tool is formed from a molded polymer material.

12. A flaring tool for a braided cable, comprising:
a monolithic body including:
a pair of opposing clamping jaws, each jaw defining a flaring edge on an interior surface thereof;
a cable space defined between the flaring edges of the clamping jaws;
a living hinge defined between the clamping jaws and enabling relative motion of the clamping jaws; and
a pair of lever arms, each lever arm fixedly connected to one of the clamping jaws on a side opposite the hinge.

13. The flaring tool according to claim 12, further comprising an elastic element arranged between the pair of lever arms.

14. The flaring tool according to claim 12, wherein each flaring edge defines a concave flaring surface.

15. The flaring tool according to claim 14, wherein the flaring edges oppose one another.

16. The flaring tool according to claim 14, wherein each flaring edge comprises at least two adjacent linear edge segments, the adjacent linear edge segments extending obliquely relative to one another.

17. The flaring tool according to claim 12, wherein in an undeformed state of the tool, the lever arms are oriented obliquely relative to one another and the elastic element extends non-linearly therebetween.

18. A flaring tool, comprising:
a first gripping arm and a second gripping arm hingedly connected to the first gripping arm, the first and second gripping arms each defining a flaring edge, the flaring edges include a first protruding edge extending from an interior side of the first gripping arm in a direction of the second gripping arm, and a second protruding edge extending from an interior side of the second gripping arm in a direction of the first gripping arm;
a cable space defined between the flaring edges and sized to receive a cable to be flared;
a first lever arm and a second lever arm extending from the first gripping arm and the second gripping arm, respectively; and
a connecting element arranged between the first lever arm and the second lever arm, the connecting element biasing the first and second lever arms away from one another.

19. A flaring tool, comprising:
a first gripping arm and a second gripping arm hingedly connected to the first gripping arm, the first and second gripping arms each defining a flaring edge;
a cable space defined between the flaring edges and sized to receive a cable to be flared;
a first lever arm and a second lever arm extending from the first gripping arm and the second gripping arm, respectively; and
a connecting element arranged between the first lever arm and the second lever arm, the connecting element formed between respective free ends of the first and second lever arms and biasing the first and second lever arms away from one another.

20. The flaring tool according to claim 19, wherein at least one of the connecting element and the first and second lever arms define opposing recesses in an interior surface of the tool.

* * * * *